Sept. 22, 1959 A. L. HUBBARD 2,904,948
COTTON HARVESTER
Filed Dec. 9, 1957 4 Sheets-Sheet 1

INVENTOR.
A. L. HUBBARD
ATTORNEYS

Sept. 22, 1959　　　A. L. HUBBARD　　　2,904,948
COTTON HARVESTER
Filed Dec. 9, 1957　　　　　　　　　　　　4 Sheets-Sheet 2
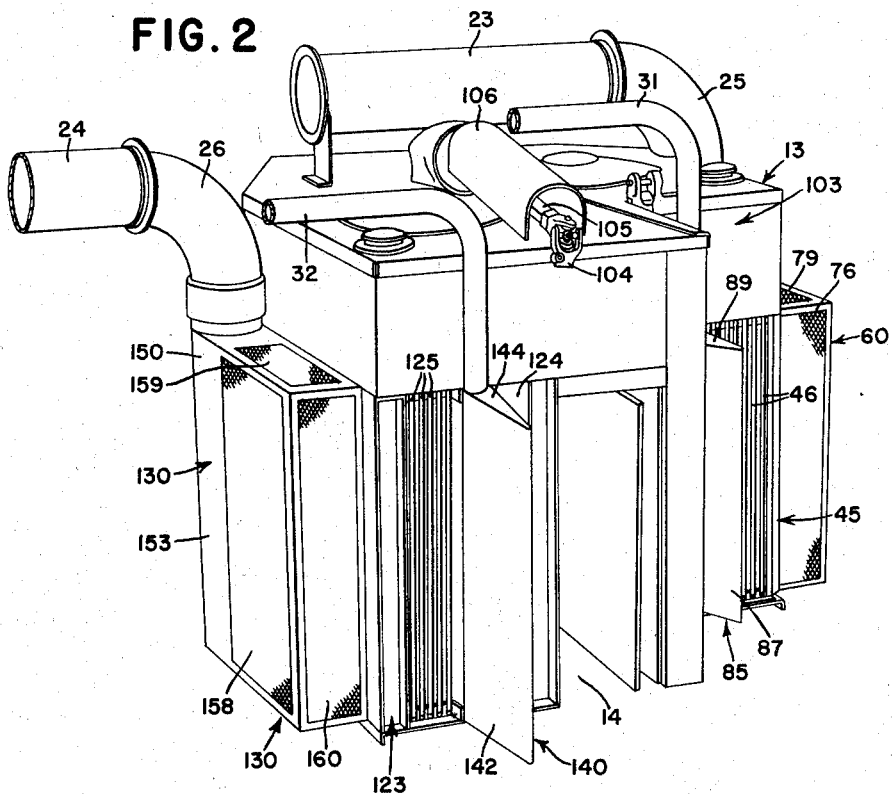
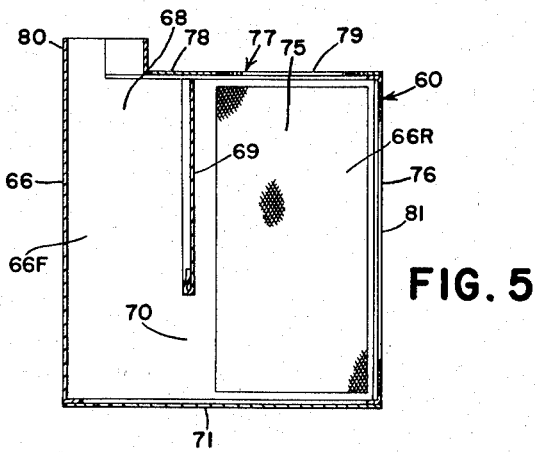
INVENTOR.
A. L. HUBBARD
ATTORNEYS Sept. 22, 1959     A. L. HUBBARD     2,904,948
COTTON HARVESTER Filed Dec. 9, 1957                                                     4 Sheets-Sheet 3

INVENTOR.
A. L. HUBBARD

BY

ATTORNEYS

Sept. 22, 1959  A. L. HUBBARD  2,904,948
COTTON HARVESTER

Filed Dec. 9, 1957  4 Sheets-Sheet 4

INVENTOR.
A. L. HUBBARD

ATTORNEYS

_United States Patent Office_

2,904,948
Patented Sept. 22, 1959

2,904,948
COTTON HARVESTER

Arthur L. Hubbard, Des Moines, Iowa, assignor, by mesne assignments, to Deere & Company, a corporation of Delaware Application December 9, 1957, Serial No. 701,541

28 Claims. (Cl. 56—41)

This invention relates to a cotton harvester of the type in which an upright spindle drum operates to move spindles through a cotton plant for purposes of detaching the bolls from the plant and to then move the spindles inwardly of a picker housing. A doffing mechanism operates to remove the bolls from the spindles and feeds them into suction ducts. More particularly this invention relates to housing means for use in combination with this type of harvester which will relieve the effect of air turbulence associated with and created as a result of operation of the spindle drum, doffing mechanism, and suction ducts.

A representative cotton picker of the general class referred to is disclosed in the U.S. patent to Paradise 2,660,852, wherein it will be seen that the picking machine operates over a field in which the cotton is planted in rows, the machine having one or more picking units for picking from the rows. Each picking unit includes picking spindles that are barbed and rotate to pull the cotton from the ripened bolls as the machine advances, the spindles being arranged in a drum which rotates at a relatively high rate of speed as a unit to carry the spindles in an orbit through the plants and then back through a doffing mechanism from which the cotton is doffed for ultimate transfer to a basket or receptacle by pneumatic conveying means. The doffing mechanism normally includes a doffing drum comprised of a plurality of vertically spaced doffing plates which operate at a relatively high rate of rotation. The basket is relatively remote from the doffing mechanism and the pneumatic conveying means includes a cotton and air inlet adjacent to the forward end of the picking unit and forwardly of the doffing means so that the doffed cotton may be transferred to the conveying means. It is conventional practice to provide the cotton and air inlet in the form of a door that encloses the picking unit at the side thereof to which the doffing mechanism is adjacent, the door having an imperforate outer panel and an inner panel provided with the inlet opening. The doors hinge so that access may be had to the picking mechanism.

In the above type of picking mechanism, there is considerable air turbulence created not only by the effect of the suction but also as a result of the high rate of rotation of both the spindle drum and the doffing drum. There is also generally created a problem of eliminating trash collected on the spindles in the picking operation from the picking mechanism prior to the cotton being fed to the basket. Unless the trash is removed from the cotton, the trash will often be gathered by the air flow and fed into the suction ducts to be conveyed into the baskets or containers. Obviously the effect of collecting the trash in the carton is to create a poor grade of cotton with the ultimate effect being a reduced price for the cotton.

It is the primary object of this invention to provide a housing structure to operate in combination with the above type of picking mechanism in which openings are provided and strategically placed to pass the trash being thrown centrifugally from the picking spindles outboard of the housing and to provide openings properly positioned adjacent to spindle and doffing drums which permits air to enter the picking chamber to fill the low pressure areas created as a result of the rotation of the drums and picking spindles and to further provide that the air so entering will not include trash.

It is a further main object of this invention to provide a door which includes the means for attachment to the suction duct which is perforated sufficiently to permit clean air being fed into the suction ducts to enter the ducts through the perforated walls of the door. The purpose of the perforated walls is to prevent the trash within the picking and doffing areas to be drawn into the suction ducts and into the baskets.

It is still a further object of the invention to provide within the picker housings upright plate members which will operate to peel off the trash from the rotating spindle and doffing drums and to relay the trash outwardly of the picking unit.

Still a further object of the invention is to positively supply air into the picker housing which will operate to drive the trash from the picker housing.

Overall, it may therefore be said that the purpose of the present invention is to control the air, in both its inlet and outlet phases, within the picking mechanism so as to prevent the trash accumulated in the picking operation from entering into the suction ducts.

Other objects and advantages of the present invention will become apparent to those familiar with the art as the present invention is described in relation to the accompanying drawings.

Fig. 2 is a rear side perspective of the picker housing and other portions of the harvester.

Fig. 5 is a sectional view of the door taken substantially along the line 5—5 of Fig. 3.

Figure 1:
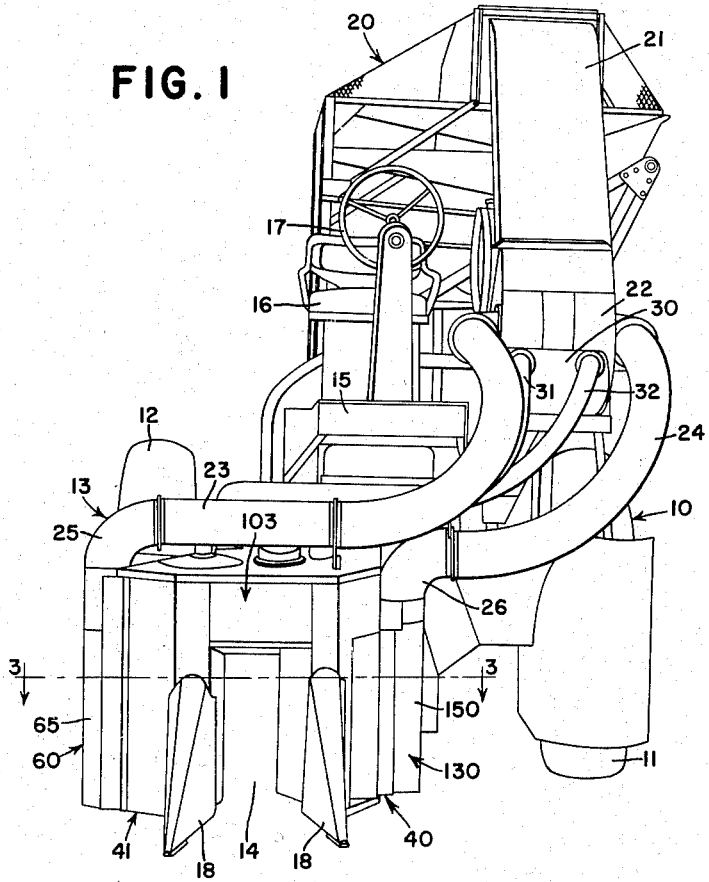
Fig. 1 is a front perspective view of a cotton harvester and its associated tractor.
Figure 6:
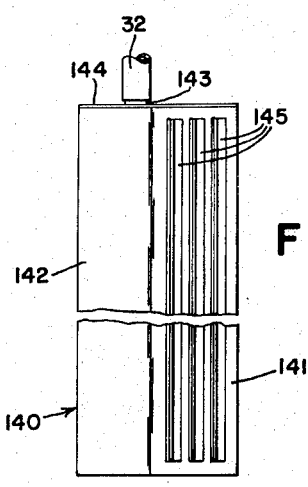
Fig. 6 is a sectional view taken substantially along the line 6—6 of Fig. 3.

The picking machine chosen for purposes of illustration comprises a supporting frame or body 10 which is conventionally a tractor operated in reverse to advance the cotton harvester over the field. Visible in Fig. 1 are the rear tractor wheels 11, 12. The tractor 10 carries forwardly thereof a picking mechanism housing structure, indicated in its entirety by the reference numeral 13, having a fore-and-aft extending picking passageway or throat 14 positioned centrally in the housing and extending lengthwise of the housing. The purpose of the throat is to permit the row planted cotton to pass through the harvesting mechanism. The supporting structure between the tractor 10 and the housing 13 is also of conventional design and is of no importance relative to the present invention. However, a preferred arrangement for mounting the harvester on the tractor 10 is shown and described in detail in U.S. Patent 2,719,394, issued to Fred. A. Thomann and Robert H. Meier, October 4, 1955.

The body or tractor 10 carries a forwardly positioned operator's platform 15 on which is supported a seat 16 and a steering wheel 17 for guiding the machine. Cotton plants are guided into the throat or passageway 14 by dividers or plant lifters 18. Also supported on the tractor 10 is a large basket or container 20 into which the cotton bolls are blown through a blower duct 21. A blower, indicated in its entirety by the reference numeral 22, provides air for the duct 21. The intake for the blower 22 is provided at opposite ends of its housing by a pair of suction ducts 23, 24 which extend downwardly and forwardly from the blower 22 and are connected to the forward end of and on opposite sides of the housing structure 13. Elbow couplings 25, 26 are provided at the intake end of the suction ducts 23, 24 and are in turn connected to opposite side portions of the housing structure 13. Just forwardly of the blower 22 is an additional fan 30 and a pair of forwardly and downwardly extending flexible pipes 31, 32 which serve to move air from the fan 30 to the rear portion of the housing structure 13. Other than the fan 30 and its associated discharge pipes 31, 32 the picker, up to this point, is more or less of conventional design and such has been described only for purposes of orientation. The description so far has generally been limited to the mechanism for moving the cotton bolls from the picking mechanism to the container or basket 20.

Figure 3:
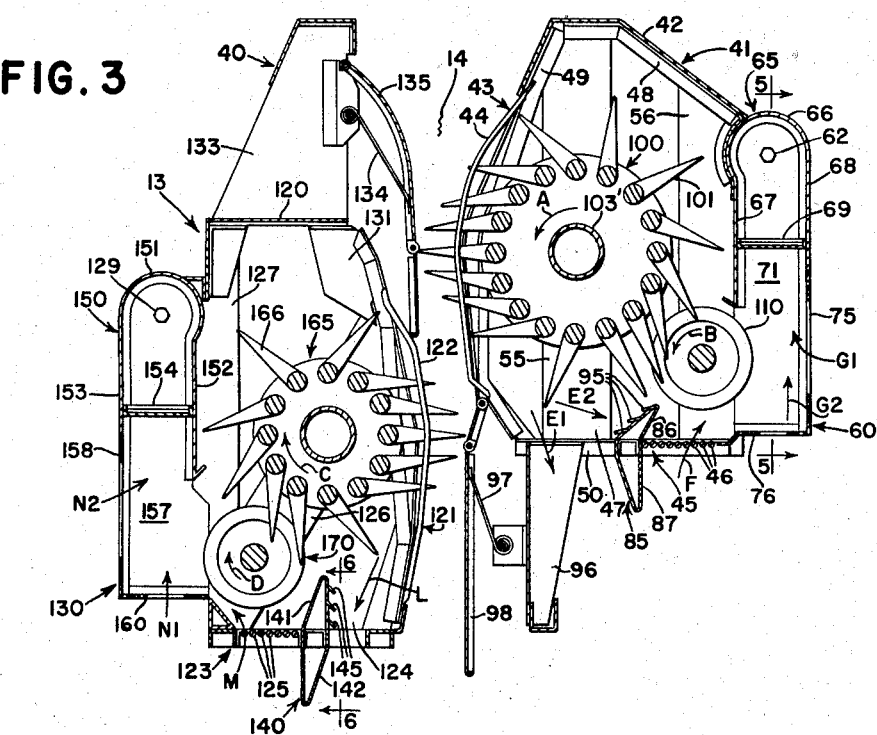
Fig. 3 is a sectional view taken substantially along the line 3—3 of Fig. 1.

Referring now to Fig. 3, the harvester is composed of a pair of harvesting mechanisms or picking units 40, 41 positioned on the left and right sides of the throat or passage 14 respectively. The right picking unit 41 is composed of a picker housing formed by front or forward upright wall structure 42 generally imperforate and extending around the front portion of the unit 41. The exact configuration of the front housing structure 42 is unimportant other than to recognize that it does enclose completely the forward end of the picking mechanism. Side or passage adjacent wall structure 43 extends from the inner end or edge of the forward housing structure 42 rearwardly. As is conventional, the housing structure 43 adjacent to the passage 14 is composed of a plurality of vertically spaced horizontal grid bars 44 which form between them fore-and-aft extending passages through which the spindles on the picking drum (later to be explained) may pass into the passage 14. At the rear of the unit 41 there is provided rear upright wall structure 45 which is generally disposed transversely to the direction of travel of the harvesting unit. The rear housing structure is formed at its right end by a plurality of vertically disposed and transversely spaced apart bars 46 forming an air intake opening through which a natural flow of air between the atmosphere and the inside of the housing structure is permitted. The bars 46 are spaced apart so as to permit large particles of trash, leaves, and other foreign matter thrown against the bars to pass through. The left end of the rear end of the upright housing structure 45 has a large upright and elongated trash discharge opening 47 through which trash leaving the spindles on the spindle drum (later to be described) may pass. All of the housing structures 41, 43, and 45 are flanged at their lower and upper ends such as at 48, 49, and 50 to provide both strength to the housing structures and to provide means for attaching the upright sides to the top and the bottom of the housing structures. The bottom of the housing structure (shown generally in Fig. 4) comprises a pair of fore-and-aft extending plates 55, 56 which are fixed at the front and rear ends to the flanges 48 and 50 respectively. The forward end of the flange 49 on the side upright structure is fixed to the forward end of the plate 55. The plates 55, 56 are spaced transversely apart to provide a generally open bottom at the base of the picking unit 41.

The unit 41 is therefore enclosed generally at the front, inner side and rear by the upright housing structures 42, 43, and 45 thereby leaving an open outer side. It should here be understood that the terms "inner," "outer," "outwardly," and "inwardly" refer generally to the location of the particular part or section relative to the throat or passage 14, the structure adjacent the throat being considered the innermost part of the harvester. Provision is made for closing the outer side of the housing compartment by means of a fore-and-aft extending door structure indicated in its entirety by the reference numeral 60.

The door 60 is hingedly mounted for horizontal movement on a forward bracket 61 which extends outwardly from the bottom plate 56 at the base of the unit 41. A vertical pivot 62 is provided at the end of the bracket 61 to permit horizontal swinging of the door 60.

The door structure 60 comprises rigidly connected panel means including an upright sheet 65 having the shape of a U, with a bight or front upright panel 66 and inner and outer upright panels 67, 68 respectively extending rearwardly from opposite ends of the front panel or bight 66 to respective upright rear terminal edges 67R, 68R respectively. The panels 67, 68 are substantially parallel and spaced apart transversely and have horizontally coplanar flanged top edges 67T, 68T and horizontally coplanar flanged bottom edges 67B, 68B. The outer panel 68 is longer than the inner panel 67 in fore-and-aft dimension to dispose its rear flanged edge 68R rearwardly beyond the rear edge 67R of the inner panel 67. An upright transverse partition panel 69 is spaced rearwardly from the bight or front panel 66 near the rear edge 67R of the inner panel 67 and has opposite upright flanged edges 69–I and 69–O fixed to the inner and outer panels 67, 68 respectively. The panel 69 has an upper edge 69T in coplanar relation to the edges 67T, 68T and a lower edge 69B spaced vertically from the edges 67B, 68B, thereby forming with the panels 67, 68 a boll passage or opening 70. A top panel plate 77, substantially equal in length to the outer panel 68, has its inner and outer fore-and-aft edge portions 77–I, 77–O secured respectively to the panel top edges 67T, 68T and further has its rear edge 77R transverse to the outer panel at the junction of the top and rear edges of said outer panel. The top plate 77 also has a front edge 77F adjacent an upper edge 66U of the front or bight panel 66. A bottom plate 71, closing the lower side of the opening 70, has a front edge 71F coincident with and secured to a bottom edge 66B of the front panel 66 and has inner and outer fore-and-aft edge portions 71–1, 71–O secured respectively to the bottom edges 67B, 68B of the side panels 67, 68. The bottom plate 71 has a transverse rear edge 71R in vertical alinement with the rear edge 77R of the top plate 77. An upright rear wall panel 76 has top and bottom flanged edges 76T, 76B secured to rear edges 77R, 71R of the top and bottom plates 77, 71 and an outer edge 76–O secured to the rear edge 68R of the outer panel. The rear wall has an upright inner edge 76–I to provide, with the inner panel rear edge 67R and the inner edge portions 77–I, 71–I of the top and bottom plates 77, 71 that exceed the length of the inner panel, a rectangular inner side opening in the door structure.

Figure 7:
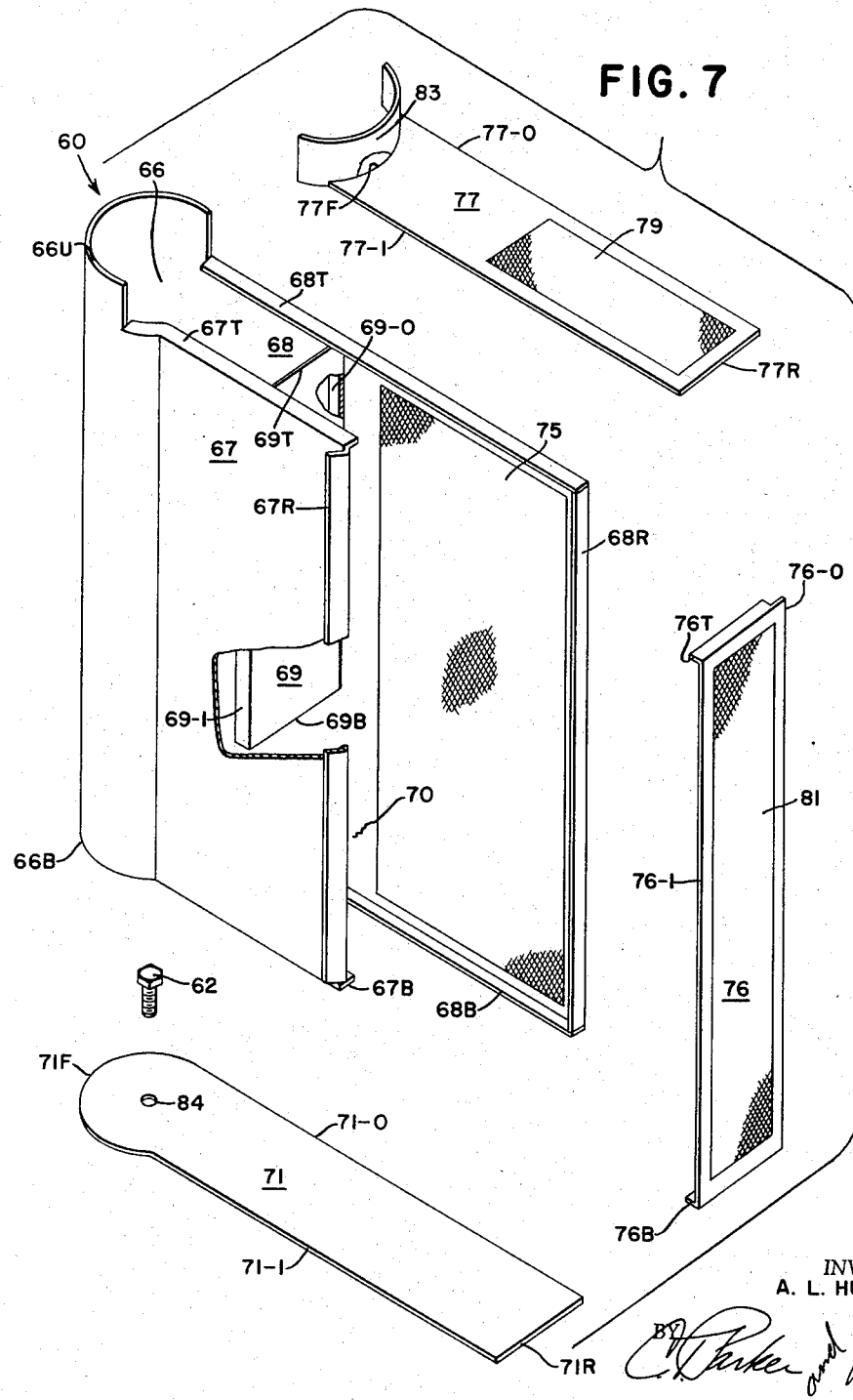
Fig. 7 is an enlarged exploded perspective view showing details of the door structure.

Viewing Figures 5, 7, it is obvious that the partition panel 69 serves to divide the door structure 60 into front and rear compartments 66F, 66R respectively, the rear compartment 66R opening into the picker housing through its inner side opening for receiving bolls from the harvesting mechanism. The outer panel 68 is characterized by having a portion, as indicated by the reference numeral 75 of the panel rearward of the transverse panel 69 perforate. Similarly, the upper panel 77 is characterized by having a portion, as indicated by the reference numeral 79, rearward of the panel perforate. The rear panel 76 has an upright elongated strip of perforated metal, this being indicated by the reference numeral 81. Therefore, it is obvious that the rear compartment 66R is perforate to permit passage of air. Also, since the partition 69 is near the rear edge 67R of the inner panel 67, the door structure may be described as having at least a portion of the outer side panel 68, top panel 77, and rear panel 76 rearward of the rear edge 67R of the inner panel as being at least partially perforate or grilled. It should be noted that the term perforate or grilled is meant to be inclusive of but not necessarily limited to all porous matter such as fabric, expanded metal, slotted metal, grille work, louvers etc.

which would permit air to pass, and restrict passage of cotton, and while the present structure is shown as having perforations in the metal any of the other type herein stated as well as those providing the same function of perforate or grilled material would suffice. It should also be noted that while the upper, side, and rear panels of the rear compartment 66R is shown as all being perforate, the exact degree of perforation as well as the exact number of panels being perforated is unimportant as long as at least a part of the panels forming the rear compartment 66R is perforated to supply air to the suction duct 23.

The exact method of fixing the panels of door structure to one another is unimportant for purposes of this invention. In practice, spot welding is used, but other types of connections such as riveting or bolt and nuts would be satisfactory.

The door structure 60 is pivotally mounted on the bracket 61 by means of a bolt 62 which extends through an opening 84 in the bottom panel 71. The door panel is connected to the elbow 25 by means of a conduit joint 80 composed of an upper extension of the bight or front panel portion 66 and a projecting semi-cylindrical shell 83 which extends upwardly from the front edge 77F of the top plate 77 and which complements the extension of the bight portion 77 to form the cylindrical joint 80. As is clear, the forward compartment 66F is imperforate except for the common opening 70 and the conduit joint opening.

Supported on the picker housing of the right picking unit 41 is an upright hollow plate member 85 positioned at the rear of the picking unit 41. The hollow plate member 85 is in cross section in the shape of two triangles, one portion 86 which extends forwardly from the rear wall structure 45 into the picker housing and a second portion 87 which extends rearwardly from the wall structure 45 and out of the picker housing. As may be seen in Fig. 3 the member 85 serves basically to separate the trash opening 47 from the air intake opening formed by the bars 46. The upright hollow member 85 is closed at both ends with the exception of a pipe extension, not shown, in an upper plate 89 on which the fan conduit 31 is mounted. The purpose of the connection is obviously to permit a pressure build-up within the hollow plate member. Vent and slot means 95 are provided in an inner face of the forwardly extending triangular portion 86 and serve the purpose of directing air through the trash opening 47. The slot and vent means 95 extend the length of the member 85.

The right picking unit 41 has a rearwardly extending bracket 96, extending from the rear of picker housing, supporting a spring 97 which operates to bias a presser plate 98, the purpose of which is to maintain the cotton plants in contact with the picking spindles of the adjacent unit 40.

Positioned internally of the housing compartment is a generally centrally located spindle drum 100 composed of a plurality of rows of picking spindle mechanism which are spaced apart vertically on the order of the spacing of the grid bars so as to permit spindles 101 to pass in the fore-and-aft extending slot or grooves between the grid bars 44 and to move front to rear in the passage 14. The spindles rotate on their axes and upon their being positioned in the stalk passage 14 operate to snag the cotton fibers and consequently to dislodge the cotton bolls from their plants. The spindle drum 100 rotates in the direction of the arrow A, Fig. 3, so that the spindles 101 will move in an orbit from front to rear in the stalk passage 14 and then inwardly of the housing compartment. The spindle drum 100 is shown generally in representative form and is described only generally for purposes of this invention. The drum 100 is supported on the horizontal plate 55 by means of a bearing support 102 also shown in representative form in Fig. 4. The spindle drum 100 is driven by means of an upright spindle drive shaft 103' which is driven by suitable drive mechanism, not shown, contained in an upper housing 103 positioned above the picking units 40, 41. Likewise, drive mechanism for operating the individual spindles 101 is also provided in that housing. The exact type of drive for operating the spindles and spindle drum are for purposes of this invention unimportant. Should a further detailed study of the drive mechanism be desired, such may be obtained by reference to U.S. Patent 2,721,436, issued to Mr. A. L. Hubbard, which shows a detailed study of the drive mechanism. The entire drive mechanism is driven from the power take-off shaft on the tractor 10 though a series of universal joints, as at 104, and a drive shaft 105. Conventional type shielding 106 is provided over the drive from the power take-off shaft.

Provided at the rear and at the outer side of the picking unit 41 is an upright doffing assemblage or drum 110. The drum cooperates with the spindles for doffing the cotton bolls therefrom. As may be seen in Fig. 3, the doffing drum 110 is positioned adjacent the opening between the upright rear edge 67R and the rear panel 76 in the door structure 60. Also, the doffing structure is directly forward of the bars 46 forming the air intake opening. Again, the doffing structure is shown in more or less representative form, the exact details being unimportant for the present invention, the important feature being its general location in the picking unit 41 and relative to the housing structure. The doffing drum rotates in the direction of the arrow B. Consequently trash which has tenaciously held to the cotton bolls will be dispatched against the bars 46 upon the cotton being doffed and since the bars are spaced apart the trash will pass between them.

The picking unit 40 to the left of the passage 14 is generally similar to that of the right unit 41. The left picker housing is composed of front or forward upright wall structure 120 across the forward end of the unit, and inner or passage-adjacent side structure 121 positioned adjacent the plant passage 14. The inner side 121 is composed of a plurality of fore-and-aft extending vertically spaced grid bars 122 which permits the spindles of the spindle drum to pass. At the rear of the unit is upright wall structure 123 which forms a trash discharge opening 124 at the right rear end of the picking unit 40. The rear upright housing structure 123 is also composed of a plurality of vertically disposed transversely spaced apart bars 125 which provides an air inlet opening to permit air to enter into the picker housing. The bars 125 are spaced apart to permit particles of trash thrown against the bars to pass through. The picker housing is further characterized by having an open-bottom structure including a diagonally extending brace member 126 which extends across the bottom of the compartment and a fore-and-aft extending outer structure member 127 which extends the length of the housing compartment. Extending outwardly from the fore-and-aft extending member 127 is a bracket 128 having a vertical pivot 129 which supports the horizontal swinging door structure 130. Other structural members such as at 131, 132 operate to reenforce the entire housing compartment. A forwardly extending horizontal brace or bracket 133 serves to support a spring 134 and presser plate 135 which operate to maintain the cotton plants in contact with the spindles 101 of the adjacent picking drum 100.

A hollow upright member 140 is positioned at the rear of the left picking unit 40 and is composed in cross section of a forwardly extending triangular shaped portion 141 which extends inwardly from the rear wall structure 123 into the harvesting compartment, and a rearwardly extending triangularly shaped portion 142 which extends rearwardly from the upright wall structure 123. As is clearly evident from viewing Figs. 2 and 3, the hollow structure 140 serves to separate the air inlet formed by the rods 125 and the trash discharge outlet 124 in the rear wall structure. Again the hollow structure is completely enclosed except for a pipe connection 143 in the top plate 144 of the member which fits into the flexible fan duct or pipe 32, and a series of vertically disposed vent and slot means 145 which is cut into the inner facing of the forwardly extending portion 141 and which permits air passing into the hollow member to be directed inwardly and rearwardly through the trash discharge opening 124.

The left-hand door 130 is similar to the right-hand door 60 on the right picking unit 41 and operates to close the open outer side of the picker housing. Briefly, the door 130 is formed by a U-shaped sheet 150 having the bight or curbed portion 151 of the U forming the forward end of the door and the legs 152 and 153 forming the inner and outer panels of the door. The door is separated into forward and rear compartments by means of a vertical transverse panel 154. The forward compartment is imperforate except for a conduit opening which is connected to the elbow 26 and a lower boll receiving opening, not shown, between a bottom plate 157 and the lower terminal edge of the vertical plate 154. The rear compartment is composed of a perforated side 158, a perforated top panel 159 (Fig. 2) and a perforated rear panel 160. As may be recognized, the door structure 150 is generally similar to the already described door structure 60, and therefore, details are generally omitted, since reference to the previous description should clear up any question as to its construction.

A spindle drum 165 composed of a plurality of rows of spindles which move from front to rear through the grid bars 122 is mounted on the diagonal brace 126. Individual spindles 166 on the drum 165 rotate about their own axis and are provided with means for snagging the fibers in the cotton bolls for picking the bolls from the plants. The drum 165, being to the rear of the opposite spindle drum 100, incorporates fewer spindles in its picking operation, this being conventional in the normal type of cotton harvester. Adjacent and to the rear of the spindle drum 165 is a doffing drum 170 which is composed of a series of vertical doffing plates spaced on the order of rows of spindles and which operates in the usual manner to dislodge the cotton from the spindles. As may be seen in Fig. 3, and as indicated by the arrows C and D, the spindle drum 165 and the doffing drum 170 operate in a clockwise direction. Both drums 165 and 170 are supported basically on the diagonal brace 126 and operate through drive mechanism incorporated in the transverse housing 103. The housing 103 serves to close the picking compartments of both the picking units 40, 41 from above and also serve to interconnect the compartments, such housing 103 being clearly shown in Fig. 1 as traversing the stalk passage 14. Other details of the left picking unit 40 are similar in many respects to that of the unit 41 on the right or are similar in operation or in mechanism to the structures shown and described in the patents previously referred to.

In operation the cotton harvester operates in the following manner. As the harvester moves forwardly over the field, cotton plants will move into and through the passage 14 where they will be first encountered by the right picking unit 41 and particularly by the spindles 101 of the spindle drum 100. Both the spindles 101 and the spindle drum 100 will rotate at a relatively high rate of rotation about their respective axes. Consequently, as the spindles move out of the passage 14 rearwardly and inwardly of the harvesting compartment, there will be a natural tendency for the trash which has also been picked with the cotton to be thrown centrifugally first from the individual spindles and then from the spindle drum 100. The trash will tend to depart from the drum 100 centrifugally and in the direction of the arrows E1, E2. It should here be noted that prior to the spindles reaching the doffing mechanism 110, the cotton will be held rather tightly by the spindles 101 and there is very little likelihood of such departing from the spindles in a centrifugal action. As may be seen in Fig. 3, the trash leaving in the direction of the arrow E1 will depart unmolested through the trash opening 47. The trash leaving the spindles in the direction of the arrow E2 will encounter or will be blocked by the forwardly extending portion 86 of the hollow plate member 85 and the apex or terminal edge of the triangular shaped portion 86 will tend to peel off the trash from the spindles. The air issuing from the hollow member 85 through the slot and vent means 95 will cause the trash to be redirected through the opening 47 again to be discarded through the trash opening. It will be noted that the apex or terminal edge of the triangular shaped portion 86 is substantially at the point of intersection between the doffer plates and the spindles 101. Therefore, the member 85 is so positioned as to peel off the maximum quantity of trash from the spindles just prior to their entering into contact with the doffing mechanism 110.

The doffing unit 110 through its high rate of rotation creates a draft directed to the forward end of the door structure 60. It will be noted that the panel 67 has its rear terminal edge 67R substantially at the circumference of the doffer drum 110 and consequently cotton will not be permitted to pass back into the picker housing once it has entered into the door structure. In a similar vein a low pressure area is formed forward of the bars 46 and air will be fed to the doffing structure 110 through the bars 46 in the direction of the arrow F. The air entering through the bars 46 will be relatively clean air inasmuch as it is drawn directly from the atmosphere. In the past, the picker housing at 46 has normally been closed and air for the doffing structure 110 has been fed directly from the spindle area and has included a considerable quantity of trash accumulated by the spindles and its picking operation. In the present invention, there is the provision first, that the trash is removed from the spindles and discharged through the opening 47 as well as positively blocked from entering the doffing area. Second, the air from the spindle area is normally cut off from the doffed cotton area by means of the triangular shaped inwardly extending portion 86 and by the side panel 67 of the door. By providing an air inlet, as formed by the bars 46, adjacent to the doffing structure 110 there is no requirement to draw air from the spindle area and consequently the contaminated or trash laden air within the spindle area is not passed on through the doffer and into the suction duct 23.

Figure 4:
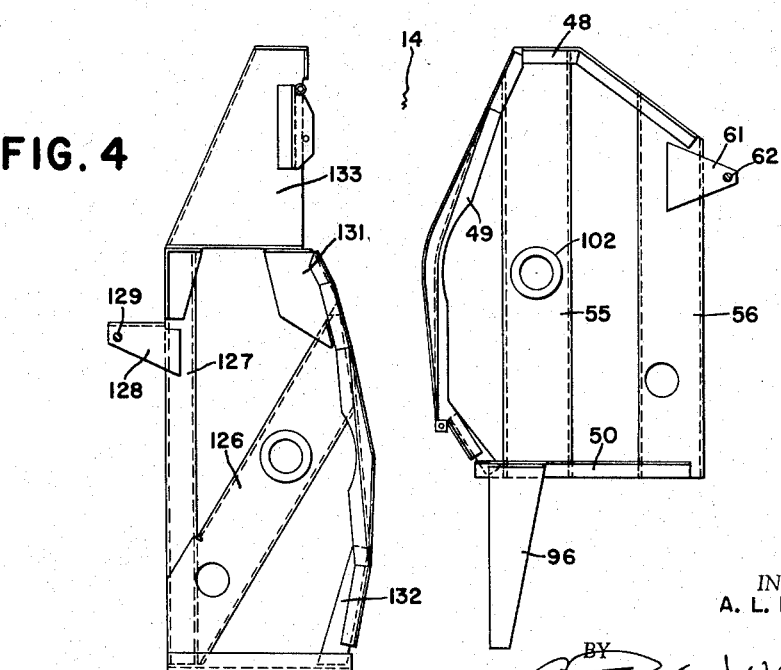
Fig. 4 is a sectional plan view showing the structure at the base of the picker housings.

Referring now to the door 60 in which the cotton doffed from the spindles is driven, it would be noted that air is provided for the suction duct 23 through the perforated panel portions 75, 76 and 79 on the side, rear, and top of the door 60, and air is drawn into the door structure in the direction of the arrows G1, G2. In the past, the panels of the door have normally been completely imperforate and air has been drawn directly from the spindle area with the effect that trash accumulated by the spindles in the picking operation was drawn directly into the suction duct 23. Again, by providing the triangular shaped member 86 to extend adjacent the periphery of the doffer 110 and the rear edge 67R of the inner panel 67 to extend adjacent the opposite side of the doffer 110 picking mechanism is in effect separated by panels from the suction area of the picking unit. Consequently, the trash attracted by the picking of the cotton bolls is prevented or blocked from entering into the suction or door area of the picking unit. Also, by providing the air inlet for the suction duct 23 in the panels of the door 60 relatively clean air is drawn into the picking unit 42 and fed through the duct system 23. This in effect prevents accumulation of trash in the doffed cotton bolls with the obvious effect of having a higher grade of cotton harvested. It should also be noted that with the elimination of the drawing of the trash into the suction chamber, the bottom of the picking unit 42 may be opened, as indicated in Fig. 4, to permit trash to gravitate onto the ground.

The purpose of the rearwardly extending triangular shaped portion 87 of the upright plate member 85 is to prevent trash exiting through the opening 47 to again be drawn into the openings between the bars 46 and into the suction area of the picking unit 41. It is felt that the length of the portion 87 is such that the trash will be clear of the suction created by both the doffer structure 110 and by the suction ducts 23.

Referring now to the picking unit 40 to the left of the plant passage 14, the accumulation of trash within the harvesting mechanism is somewhat reduced inasmuch as generally the loose trash on the cotton plants will be removed by the forward picking spindles 101 of the forward drum 100. Consequently, the quantity of trash brought into the housing or picking unit structure will be considerably less in the picking unit 40. In operation the picking unit will be considerably similar to that of the previously described picking unit 41. The pressure plates 135 will operate to maintain the plant in contact with the forward spindles 101 until the plants have reached a position where they come into contact with the picking spindles 166 of the rear picking drum 165. The picking drum rotating in the direction of the arrow C will cause the spindles to move in an orbit from front to rear through the grid bars 122 and reenter the picking or harvesting compartment at the rear of the compartment. The spindles will carry an accumulation of cotton bolls and trash from the cotton plants and will normally discharge centrifugally the trash from the cotton plants substantially in the direction of the arrow L and through the trash discharge opening 124. Again the upright member 140 is positioned to intercept trash which would move off the spindles in the direction of the doffing mechanism 170 and by air leaving through the vent and slot means 145 the trash which would normally pass into the doffer is driven outwardly through the trash opening 124. It will again be noted that the apex or terminal edge of the triangular shaped portion 141 is adjacent the peripheral orbit of the outer ends of the picking spindles 166 and operates to peel off the trash from the spindles.

The doffing structure 170 will create a draft which will normally drive the cotton bolls into the door structure 130. Air supplying the draft caused by the rotation of the doffer structure 170 moves between the bars 125 of the rear upright housing structure 123 in the direction of the arrow M. Consequently, the air fed to the doffer structure 170 is fed directly from the atmosphere and not through the picking or harvesting area of the picking unit 40.

Referring now to the door 130, air is fed to the suction duct 24 through the perforations in the top panel 159 and in the panel members 158, 160 in the side and rear panels as indicated by the arrows N1, N2 respectively. As was in the case of the right picking unit 41, by providing an air feed of this nature, air is not drawn from the spindle or harvesting chamber and consequently the trash accumulated in that chamber from the picking operation is not transferred into the duct 24 to cause trash laden cotton bolls to be blown in the basket 20. Again, the rearwardly extending triangular portion 142 extends rearwardly of the rear upright housing structure 123 sufficiently to prevent trash leaving through the opening 124 to move through the bars 125 and into the air supply being fed to the doffing structure 170.

It will be noted that in both the picking units 40, 41 that the spindle portion of the picking units are substantially separated from the discharge area of the picking units. More specifically, the air containing the trash from the picking operation is not permitted to enter into the discharge area of the picking unit. Likewise, air which is used for purposes of discharging the cotton bolls into the basket 20 is fed directly from the atmosphere to the suction ducts 23, 24 and does not pass through the harvesting mechanism. The ultimate effect, as mentioned, is a high grade quality of picked cotton.

While only one form of the invention has been shown, it should be recognized that other forms and variations will be suggested. It should therefore be understood that while the preferred embodiment of the invention was shown and described in detail for purposes of fully and concisely illustrating the principles of the invention, there is no intent to narrow or limit the invention beyond that set forth in the appended claims.

What is claimed is:

1. In a cotton harvester movable forwardly over a row of ground-borne cotton plants and having a suction fan and suction duct means, transversely spaced picking units defining a relatively narrow plant passage inwardly of and between the picking units for successively receiving the plants as the harvester moves forwardly, each of the picking units comprising: wall structure including forward upright structure, rear upright structure having a trash discharge opening and an air passage outwardly respectively of the trash discharge opening, upright side structure adjacent the passage connecting the front and rear upright structure and having therein a plurality of fore-and-aft extending vertically spaced spindle slots, a bottom structure closely adjacent to the ground and interconnecting the front, rear, and side structures, top structure interconnecting the front, rear, and side structures and defining with the aforesaid structures a picker housing having an open outer side; a vertically disposed picking drum supported for movement in the picker housing adjacent the side structure and having a plurality of horizontal rows of spindles spaced apart vertically on the order of the spindle slots, said spindles being operative upon movement of the drum to move through the slots and into the plant passage for picking cotton bolls and incidental trash and to dispatch trash centrifugally through the trash opening in the rear upright structure upon reentry into the picker housing; doffing mechanism mounted in the housing associated with the picking drum including an upright rotatable assemblage positioned proximate and forwardly of, and effective upon rotation to draw air through the air passage in the rear wall structure, the assemblage including radial doffing members adapted to engage and remove the cotton on the spindles and to discharge the cotton through the open outer side of the picker housing; upright plate means extending forwardly from the rear upright structure between the trash discharge opening and air passage and terminating proximate the doffing mechanism and picking drum; and panel means defining a door structure closing the open outer side of the picker housing and having a suction opening communicating with the suction duct means; and means mounting the panel means on the picker housing.

2. In a cotton harvester movable forwardly over a row of ground-borne cotton plants, transversely spaced picking units defining a relatively narrow plant passage for successively receiving the plants as the harvester moves forwardly, each of the picking units comprising: a picker housing including rear wall structure having an elongated upright trash discharge opening; a vertically disposed picking drum supported for movement in the picker housing having a plurality of vertically spaced spindles, said spindles being operative upon movement of the drum to move in the plant passage for picking cotton bolls and incidental trash and to dispatch trash through the trash opening in the rear wall structure; doffing mechanism mounted in the picker housing associated with the picking drum for doffing cotton from the spindles; an upright plate member mounted on the housing structure adjacent the trash discharge opening and including a portion extending forwardly of the rear wall structure and terminating proximate the doffing mechanism and spindle drum and operative to block trash dispatched from the spindles from entering the vicinity of the doffing mechanism and for directing the trash through the discharge opening.

3. The invention defined in claim 2 further characterized by said plate member being hollow and having a wall therein with slot and vent means for directing air internally of the hollow plate member outwardly toward the trash discharge opening; and air pressure means connected internally to the hollow plate member for driving air through the slot and vent means.

4. A picking unit for a cotton harvester movable over a row of ground-borne cotton plants and having a suction fan and suction duct means, comprising: a picker housing including wall structure having an elongated upright trash discharge opening and an open outer side; a vertically disposed picking drum supported for movement in the picker housing having a plurality of vertically spaced spindles, said spindles being operative upon movement of the drum to move in an orbit part of which is from front to rear in the row of cotton plants to pick cotton bolls and incidental trash and to dispatch trash through the trash opening in the wall structure; door structure composed of panel means closing the open outer side of the picker housing and having a material discharge opening into the suction duct means, said panel means having at least part thereof perforated to permit flow of air into the suction duct means; doffing mechanism mounted in the picker housing associated with the picking drum for doffing cotton from the spindles and effective to dispatch the cotton into the door structure; an upright plate member mounted on the housing structure adjacent the trash discharge opening and including a portion extending internally of the wall structure and terminating proximate the doffing mechanism and spindle drum and operative to block trash dispatched from the spindles from entering the area of the door structure.

5. A cotton picking unit movable forwardly adjacent and to one side of a row of cotton plants comprising: a picker housing including rear wall structure having an elongated and upright trash discharge opening; an upright picking drum supported for movement in the housing forwardly of said discharge opening including therein a series of vertically spaced spindles, said drum being effective upon movement to move the spindles externally of the housing from front to rear and in the row of cotton plants for picking cotton and incidental trash, and to dispatch trash upon reentry into the housing in the direction of the trash discharge opening; a rotatable doffing mechanism associated with the picking unit and effective to remove the cotton from the spindles; and means mounting the doffing mechanism internally of the housing forwardly of the wall structure and to the side of the trash discharge opening away from the row of plants.

6. The invention defined in claim 5 further characterized by means in said housing effecting a draft rearwardly and through the trash discharge opening for aiding movement of the trash through the opening.

7. The invention defined in claim 5 further characterized by vertically disposed plate means extending forwardly from the rear wall structure, said plate means being effective to block trash from entering the doffing mechanism.

8. A picking unit for a cotton harvester comprising a vertically elongated housing having a peripheral side portion, a picking drum mounted in said housing, said drum having picking spindles extending laterally therefrom, said housing having a vertically extending opening in its side portion through which said spindles extend, said housing having on its interior surface a baffle member extending substantially the entire height thereof, and a cotton doffing means within the housing spaced beyond said baffle member, whereby when cotton and trash are brought into said housing by said spindles the trash will strike said baffle member and be permitted to depart out of the housing while the cotton will be carried on and removed by said doffing means.

9. The invention defined in claim 8 further characterized by the housing being open at its bottom whereby trash striking the baffle member may gravitate outwardly of the housing through the open bottom.

10. The invention defined in claim 8 in which the doffing means is in the form of a doffing drum composed of vertically stacked doffing plates spaced apart to permit the spindles to move therebetween and further characterized by the baffle member extending inwardly from the housing to terminate proximate the initial point of overlap of said spindles and said doffing plate.

11. The invention defined in claim 8 in which the baffle member lies adjacent and closely proximate the doffing mechanisms and extends inwardly of the housing to a terminal edge closely adjacent the spindles.

12. The invention defined in claim 8 further characterized by said housing further having a vertically extending opening beyond the baffle member and adjacent the doffing means whereby said baffle member will prevent trash leaving the spindles from mingling with the air passing through the latter opening.

13. The invention defined in claim 11 further characterized by an upright grille supported by the housing over the opening adjacent the doffing means.

14. The invention defined in claim 8 further characterized by the baffle member being hollow and having a wall of grille structure facing the trash leaving the spindles and air pressure means connected to the baffle for causing a stream of air to pass through the grille structure for blowing said trash outwardly of the housing.

15. A picking unit for a cotton harvester comprising a vertically elongated housing having peripheral side portions, a picking drum mounted in said housing, said drum having picking spindles extending laterally therefrom, said housing having a vertically extending spindle opening in one of its side portions through which said spindles extend and a vertically extending trash discharge opening in another of its side portions, said housing having on its interior surface an upright baffle member extending inwardly from the latter side portion, said baffle member being disposed beyond the trash discharge opening, and a cotton doffing means within the housing spaced beyond said baffle member, whereby when cotton and trash are brought into said housing by said spindles the trash will strike said baffle member and be permitted to depart out of the housing via the trash discharge opening while the cotton will be carried on and removed by said doffing means.

16. The invention defined in claim 15 further characterized by said baffle member extending inwardly from the edge of the trash discharge opening.

17. A picking unit for a cotton harvester comprising a vertically elongated housing having peripheral side portions, a picking drum mounted in said housing, said drum having picking spindles extending laterally therefrom, said housing having a vertically extending spindle opening in one of its side portions through which said spindles extend, and a plurality of vertically extending trash discharge openings in another of its side portions, said housing having on its interior surface an upright baffle member extending inwardly from the latter side portion beyond at least one of the trash discharge openings, and a cotton doffing means within the housing spaced beyond said baffle member, whereby when cotton and trash are brought into said housing by said spindles the trash will strike said baffle member and be permitted to depart out of the housing via the discharge openings while the cotton will be carried on and removed by said doffing means.

18. A picking unit for a cotton harvester comprising a vertically elongated housing having peripheral side portions, a picking drum mounted in said housing, said drum having picking spindles extending laterally therefrom, said housing having a vertically extending spindle opening in its side portion through which said spindles extend and a pair of vertically extending trash discharge openings in another of its side portions, said housing having on its interior surface an upright baffle member extending inwardly from the latter side portion beyond at least one of the trash discharge openings, a cotton doffing means within the housing spaced beyond said baffle member, whereby when cotton and trash are brought into said housing by said spindles the trash will strike said baffle member and be permitted to depart out of the housing via the trash discharge openings while the cotton will be carried on and removed by said doffing means, and an upright baffle member on the exterior surface of said housing betwixt the pair of the openings and extending outwardly from the respective wall portion for directing trash leaving via the first of the discharge openings away from the housing.

19. A picking unit for a cotton harvester comprising a vertically elongated housing having a peripheral side portion, a picking drum mounted in said housing, said drum having picking spindles extending laterally therefrom, said housing having a vertically extending opening in its side portion through which said spindles extend, said housing having on its interior surface a baffle member extending substantially the entire height thereof, a cotton doffing means within the housing spaced beyond said baffle member, whereby when cotton and trash are brought into said housing by said spindles the trash will strike said baffle member and be permitted to depart out of the housing while the cotton will be carried on and removed by said doffing means, said housing having a cotton discharge opening in a side portion adjacent to and beyond the doffing means for passing cotton removed by the doffing means, and door structure mounted on the housing closing the cotton discharge opening, said door structure being composed partially of grilled panels.

20. The invention defined in claim 19 further characterized by the housing structure having a vertically extending trash discharge opening in a side portion adjacent the baffle member whereby trash striking the opening may pass outwardly of the housing via said trash discharge opening.

21. The invention defined in claim 19 further characterized by the housing having a vertically extending trash discharge opening in a side portion whereby when cotton and trash are brought into said housing by said spindles, the trash may depart from the housing via the trash discharge opening prior to the cottom being removed by said doffing means, and said housing having on its exterior surface an upright plate extending outwardly of the housing betwixt the trash discharge opening and the door structure.

22. A picking unit for a cotton harvester comprising a vertically elongated housing having a peripheral side portion, a picking drum mounted in said housing, said drum having picking spindles extending laterally therefrom, said housing having a vertically extending opening in its side portion through which said spindles extend, said housing having on its interior surface a baffle member extending substantially the entire height thereof, a cotton doffing means within the housing spaced beyond said baffle member, whereby when cotton and trash are brought into said housing by said spindles the trash will strike said baffle member and be permitted to depart out of the housing while the cotton will be carried on and removed by said doffing means, and said housing further having a vertically extending opening in a peripheral side portion adjacent the drum for passing trash outside the housing, and a vertically extending opening in a peripheral side portion adjacent the doffing mechanism.

23. The invention defined in claim 22 further characterized by the drum and doffing means being mounted in the housing forwardly of their respective adjacent openings whereby material passing through the openings will pass between an area harvested by the picking unit and an area internally of the housing.

24. A picking unit for a cotton harvester having a suction type conveying system, comprising: a vertically elongated housing having a peripheral side portion, a picking drum mounted in said housing, said drum having picking spindles extending laterally therefrom, said housing having a vertically extending opening in its side portion through which said spindles extend, said housing having on its interior surface a baffle member extending substantially the entire height thereof, and a cotton doffing means within the housing spaced beyond said baffle member, whereby when cotton and trash are brought into said housing by said spindles the trash will strike said baffle member and be permitted to depart out of the housing while the cotton will be carried on and removed by said doffing means, said housing having a cotton discharge opening in a side portion adjacent to and beyond the doffing means for passing cotton removed by the doffing means, and panel means defining a door structure mounted on the housing for closing the cotton discharge opening, said door structure having an outlet opening to suction type conveying means, said panel means being at least partially formed to permit passage of air from outward of the housing into the suction type conveying system.

25. The invention defined in claim 8 further characterized by the wall portion having a trash discharge opening adjacent the baffle member through which trash from the spindles may leave the housing, and blower means within the housing directing a draft outwardly through the opening to aid movement of the trash.

26. The invention defined in claim 5 further characterized by a vertically dispersed plate projecting rearwardly from the rear wall structure and adjacent the trash discharge opening to effect guidance of the trash leaving via the trash discharge opening away from the picker housing.

27. The invention defined in claim 5 further characterized by said picker housing having a cotton discharge opening outwardly of the trash discharge opening, and a vertically disposed plate projecting outwardly from the wall structure of the housing betwixt the trash discharge opening and cotton discharge opening.

28. The invention defined in claim 27 further characterized by panel means defining a door structure for closing the cotton discharge opening, at least part of said panel means being perforated; and means mounting the door structure on the picker housing.

References Cited in the file of this patent
UNITED STATES PATENTS

| | | |
|---|---|---|
| 1,091,905 | Zahner | Mar. 21, 1914 |
| 1,801,996 | Benjamin | Apr. 21, 1931 |
| 1,802,022 | Johnston et al. | Apr. 21, 1931 |
| 1,901,686 | Wirth | Mar. 14, 1933 |
| 2,140,631 | Johnston | Dec. 20, 1938 |
| 2,520,927 | Hagen | Sept. 5, 1950 |
| 2,567,357 | Turner | Sept. 11, 1951 |
| 2,649,677 | Paradise | Aug. 25, 1953 |
| 2,729,513 | Swim | Jan. 3, 1956 |
| 2,803,938 | Thomann | Aug. 27, 1957 |

UNITED STATES PATENT OFFICE
CERTIFICATE OF CORRECTION

Patent No. 2,904,948 September 22, 1959

Arthur L. Hubbard

It is hereby certified that error appears in the printed specification of the above numbered patent requiring correction and that the said Letters Patent should read as corrected below.

Column 12, line 24, for the claim reference numeral "11" read -- 12 --

Signed and sealed this 31st day of May 1960.

(SEAL)
Attest:

KARL H. AXLINE
Attesting Officer

ROBERT C. WATSON
Commissioner of Patents